United States Patent Office 2,788,482
Patented Apr. 9, 1957

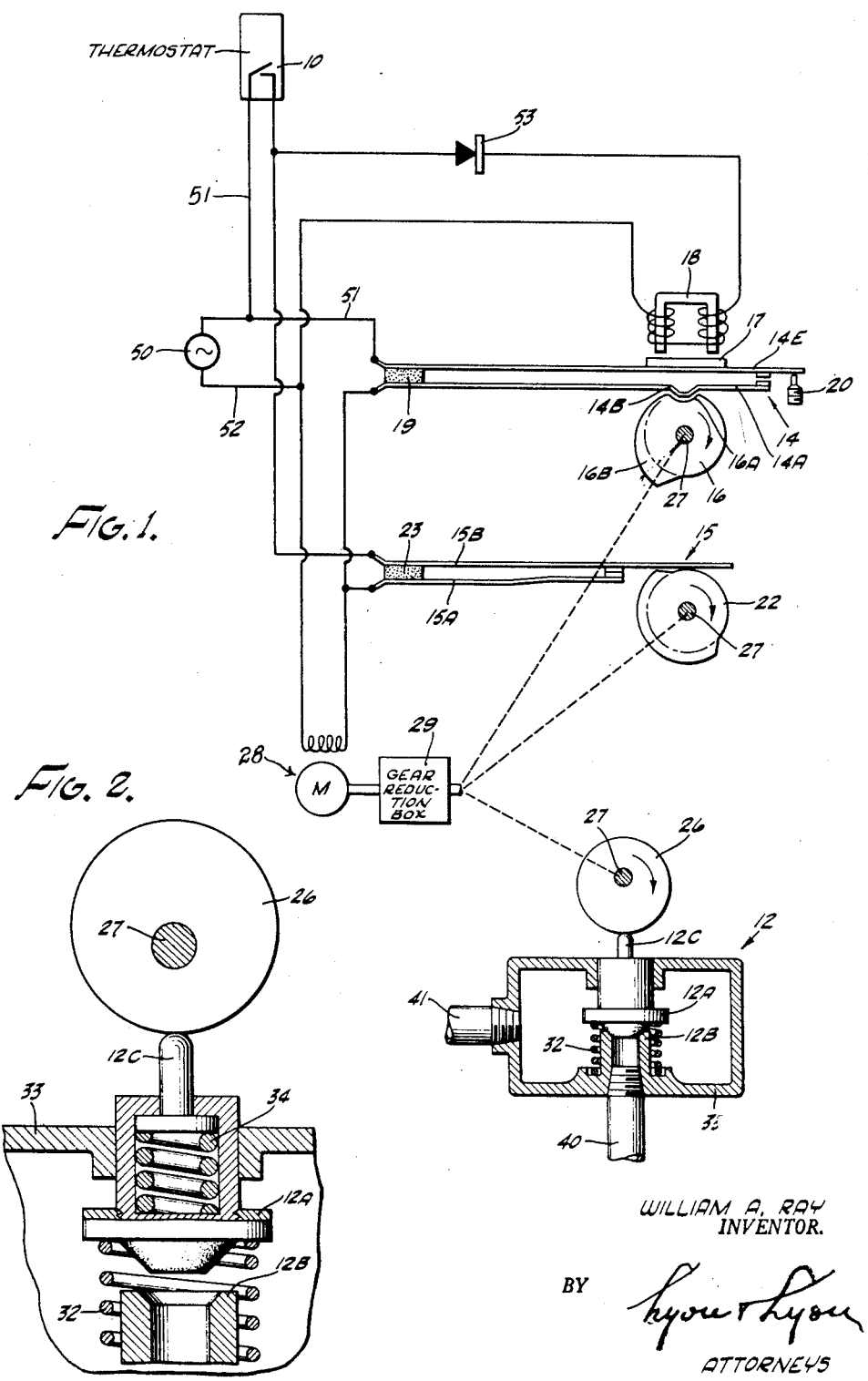

2,788,482

CONTROL SYSTEM USING CAM AND SOLENOID OPERATED SWITCH

William A. Ray, North Hollywood, Calif., assignor to General Controls Co., Glendale, Calif., a corporation of California Application February 24, 1953, Serial No. 338,525

5 Claims. (Cl. 318—466)

The present invention relates to an improved control system which is shown and described herein for opening and closing a valve in accordance with a temperature condition, but it will be appreciated from the description herein that certain aspects of the present invention are not limited to this particular use but have wider application in other systems wherein it is desired to control generally a member in accordance with a condition.

In general, the present invention, as described herein, involves a pair of cam operated switches for controlling the energization of a translating device such as a motor, the motor in turn driving an element which controls a device, the device in this instance being a valve. In accordance with one important aspect of the present invention, a first one of the abovementioned switches has one contact thereof controlled by a cam and the other associated contact controlled by a solenoid. A master control device, such as a thermostat, serves to control the aforementioned motor through the other one of such switches. Such first switch is connected in parallel with a series circuit, which comprises the thermostat, and the other cam operated switch so as to provide an overriding control effect, once the motor is energized, to return the valve to a closed or off position. By these means, a quiet, clickless, highly positive form of control is provided which, upon failure of the controlling device, i. e., the thermostat, results in a shutting off or closing of the valve. In accordance with one of the important aspects of the present invention, this is accomplished by using only two wires to the thermostat.

It is therefore a general object of the present invention to provide improved techniques whereby the above-indicated functions and results may be obtained.

A specific object of the present invention is to provide a control system of this type which is characterized by its simplicity, reliability and quietness.

Another specific object of the present invention is to provide an improved control system of this type which, upon failure of the controlling device, i. e., the thermostat, automatically causes the control element, i. e., the valve, to be moved to a predetermined safe position, namely a closed position.

Another specific object of the present invention is to provide a control system of this type which requires only a two-wire control circuit to the thermostat or outside limit control, as the case may be.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows, partly in structural form and partly in schematic form, apparatus embodying features of the present invention; and Figure 2 shows a part of the structure illustrated in Figure 1 in a different operating position and with one of the elements thereof in section for purposes of showing the internal buffer spring.

The invention pertains broadly to a controlling device shown herein as a thermostat 10 for controlling a control device which is illustrated herein as a valve 12. It will be understood, of course, that the controlling device 10 and the control device 12 may take other forms and be different types of elements; for that reason, the thermostat and valve shown herein are exemplary of those others which may be substituted equally well in the control system which is now described.

The control system incorporates two cam operated switches, namely the switches 14 and 15. The switch 14 includes a cantilever supported spring switch element 14A, having a bent portion 14B thereof cooperating with the motor driven cam 16, and a cooperating cantilever supported spring switch element 14E upon which is mounted an armature 17 magnetically associated with a solenoid 18. Both elements 14A and 14E have opposite ends thereof mounted on the insulating member 19 which spaces the same. Also associated with the switch 14 is the stop member 20 which provides a means for limiting movement of the switch element 14A when, for example, the solenoid 18 is de-energized in the operation of the system, as described hereinafter.

The bent portion 14B is arranged to enter the dwell 16A in the cam 16 to allow the switch 14 to open; likewise, such bent portion 14B contacts the periphery of the cam 16 so that the switch contact 14A may contact the other switch contact 14E. When the solenoid 18 is energized, the switch element 14E is raised a sufficient distance so that the switch 14 is prevented from being closed.

The other switch 15 comprises a pair of similar cantilever supported spring switch elements 15A, 15B, the switch element 15B being extended so that it may cooperate with the periphery of the cam 22 to effect opening of the same. The elements 15A and 15B have opposite ends thereof supported on the insulation 23. It is noted that the switch 15 is a normally closed switch, i. e., the switch elements 15A, 15B are in engagement when the cam 22 is out of engagement with the switch 15B; likewise, the switch 14 is a normally open switch since the elements 14A, 14E are out of engagement when the bent portion 14B is in the cam dwell 16A.

The switch cams 16 and 22, as well as a valve actuating cam 26, are all mounted on a common shaft 27 which is driven by a controlled motor 28 through a gear reduction box 29.

As alluded to hereinabove, the cam 26 may operate control elements other than the valve 12. The valve 12 is shown in its off or closed position, the valve element 12A being held in a closed position in engagement with the valve seat 12B by the cam 26. Valve element 12A is normally urged upwards by a relatively weak coil compression spring 32 having one of its ends seated on the valve casing 33 and the other one of its ends abutting the valve element 12A. The valve member 12A slidably receives the valve actuating element 12C, the valve actuating element 12C being pressed upwardly by a relatively strong coil buffer spring 34 which has one of its ends seated on the valve element 12A and the other one of its ends pressing upwardly on the valve actuating member 12C. The valve actuating member 12C is always in engagement with the periphery of the cam 26.

By these means, the flow of fluid from the supply line 40 to a discharge line 41 is controlled. It is understood, of course, that the construction of valve 12 may take other forms and shapes, and the particular construction shown here merely exemplifies those other constructions and forms. The valve 12 may be used for different purposes. It may, for example, be used to control the flow of fuel which is burned by apparatus (not shown herein) to heat an enclosure such as, for example, a room containing the thermostat 10, so that such thermostat 10 may be subject to temperature variations in the heated room.

Electric power is applied to the control apparatus by the alternating current voltage source 50 which has one of its leads 51 connected to one terminal of the thermostat 10 and also to the switch contact 14E, the other terminal of the thermostat 10 being connected to one terminal of the rectifier 53. The other lead 52 of source 50 is connected to one terminal of the motor 28 and also to one terminal of the solenoid 18, the other terminal of the motor 28 being connected to switch elements 15A and 14A, and the other terminal of the solenoid 18 being connected to the other terminal of rectifier 53. Thus, the thermostat 10 is connected in a serial circuit with the solenoid 18 through rectifier 53 so that the solenoid 18 is energized whenever the thermostat 10 is closed. Thermostat 10, of course, includes an electrical switch which, for example, may be of the bimetallic type and which is automatically closed whenever the ambient temperature falls below a predetermined magnitude. Thus, whenever the ambient temperature falls below a predetermined magnitude, the solenoid 18 is energized to attract the armature 17. It is noted also that the thermostat 10 is connected in a serial circuit which includes the source 50, thermostat switch 10, switch 15 and motor 28, so that the motor 28 may be energized whenever the switch 10 and switch 15 are simultaneously closed. Another serial circuit includes the source 50, switch 14 and the motor 28.

The switch 10, as shown in its open position, as a result of a relatively high ambient temperature, thus requires no flow of fuel from the supply line 40 to the discharge 41, i. e., under these conditions the valve 12 is closed.

Assuming that the ambient temperature drops, the switch 10 is closed and the motor 28 in such case is energized through the serial circuit which includes the source 50, the thermostat 10, normally closed switch 15, and motor 28. Thus, the motor 28 becomes energized and the shaft 27 is rotated. Also under this condition, the solenoid 18 is energized since it is connected in a serial circuit which includes source 50, switch 10, and the solenoid 18. At this time, however, the armature 17, although in the magnetic field produced by solenoid 18, is not in engagement with the core of the solenoid 18 since insufficient magnetic force is developed to overcome the stiffness or resiliency of spring contact 14E. In other words, the magnetic force developed by the solenoid 18 is not sufficient to cause the armature 17 to move into engagement with the core of the solenoid 18 at this particular time, although the magnetic force developed by the solenoid 18 is sufficient to maintain the armature 17 in abutment with the solenoid core once it is moved closer to the same. This is in accordance with the fact that the magnetic force required to hold a relay armature in engagement with its core is substantially less than that required to attract and move the same.

In order to allow use of a relatively small solenoid 18 and, in general, to produce the type of operation described herein, the switch element 14A is moved closer to the core of solenoid 18 upon rotation of the cam 16. For this purpose, the cam 16 has a raised portion or lobe 16B which engages the bent portion 14B to initially cause engagement of the switch elements 14A and 14E and then subsequent upward movement of the switch contacts to a position wherein the magnetic forces are sufficient to move the armature into engagement with the core. This occurs after the cam 16 has rotated more than ninety degrees, as described later.

Thus, initially, when the cam 22 is rotated, the normally closed switch 15 is opened thereby to open the original motor energizing circuit. However, at this time, since switch 14 has in the meantime been closed, the motor 28 is energized through the switch 14, it being noted that switch 14 is closed immediately after the bent switch portion 14B is raised out of the cam dwell 16A. Thus, cam 26 is rotated to allow the valve element 12A to move to its open position under the influence of the compression spring 32. Thus, fuel is supplied to the discharge line 41, to allow heating of the chamber or room within which is disposed the thermostat 10. When the shaft 27 has rotated a sufficient angular distance, i. e. more than ninety degrees, the switch element 14E is moved sufficiently close to the core of the solenoid 18 so that the armature 17 moves further upwardly in response to the magnetic force developed by solenoid 18 thereby to open the switch 14 to, in turn, de-energize the driving motor 28 with the valve being fully open. The driving motor 28 thus remains de-energized even though the switch 10 is closed.

Thus, at this time, the valve 12 is fully open and fuel is being supplied at the maximum rate. Subsequently, when the ambient temperature is raised, the thermostat switch 10 is opened to thereby de-energize the solenoid 18. Also, the same result is obtained, i. e. de-energizing of solenoid 18, should there be an open circuit developed in the two leads extending to thermostat 10. In either case, the armature 17 is released and the spring switch element 14E swings back in contact with the switch element 14B so as to produce energization of the motor 28 and consequent rotation of the shaft 27. The rotation of the shaft 27 continues until the dwell 16A in the cam is adjacent the bent portion 14B, at which time the lower switch contact 14A moves downwardly to open the switch 14 thereby to cause the energization of the driving motor 28 with the elements assuming their position illustrated in Figure 1. Subsequently, in the event that the switch 10 is closed, indicating a cold condition, as previously described, the above cycle of events is repeated.

The system is relatively free from noise, even though a solenoid is incorporated. This freedom from noise is due partly to the fact that the solenoid requires only a flux of low density and that the solenoid armature is required to move only a relatively short distance in response to such flux, thereby avoiding the production of sharp clicking noise.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit of this invention.

I claim:

1. In a system of the character described, a controlling switch, a source of voltage, first electromagnetic means serially connected with said controlling switch and said source and energized by said controlling switch, a first control switch having a contact thereof magnetically associated with and controlled by said electromagnetic means, a second control switch, second electromagnetic means, a controlled device operated by said second electromagnetic means, means operated by said second electromagnetic means for operating said first control switch and said second control switch, a first serial circuit including said source, said second electromagnetic means and said first switch, a second serial circuit including said source, said controlling switch, said second electromagnetic means and said second switch, said first and second switches being connected in parallel to independently energize said second electromagnetic means.

2. In a system of the character described, utilization means, a controlling switch, electromagnetic means, a first control switch having a contact thereof controlled by said electromagnetic means, said electromagnetic means being energized by said controlling switch, a second control switch, both said first and second control switches serving to energize said utilization means, means connected between said utilization means and said first and second control switches for operating the same, said second control switch being connected in a serial circuit with said utilization means, and said first control switch being connected in parallel with said second control switch.

3. In a system of the character described, the subcombination comprising: a first switch having a first contact and a second contact, a solenoid having a winding, a core and an armature, said armature being mounted on said first contact, said solenoid when energized producing insufficient force to move said armature into engagement with said core in the normal position of said first contact, means for initially moving said second contact into engagement with said first contact and then moving both contacts together closer to said solenoid to a closer position wherein said armature is moved by said solenoid alone to thereby separate said first and second contacts, a translating device controlling said means, a controlling switch serially connected with said translating device and said first switch for energizing said translating device, and said solenoid being serially connected with said controlling switch.

4. In a system of the character described, a translating device, a source, a first control switch serially connected with said source and said device and having a movable contact for controlling the energization of said translating device, a magnetic core mounted on said contact, electromagnetic means, a controlling switch, said controlling switch being serially connected with said source and said electromagnetic means to energize said electromagnetic means, said electromagnetic means being magnetically associated with said magnetic core on said movable contact and being normally ineffective when energized to move said core with said movable contact, and means operated by said translating device for moving said contact to a position where said electromagnetic means is rendered effective.

5. In a system of the character described, a controlling switch, a controlled device, first means operating said controlled device, a first control switch, a second control switch, both said first and second control switches being operated by said first means, electromagnetic means, said first control switch having a contact thereof magnetically associated with and controlled by said electromagnetic means, a source of voltage, a first serial circuit extending from one terminal of said source, through said controlling switch, through said second control switch, said motor to the other terminal of said source, a second serial circuit extending from said one terminal of said source, through said first control switch, through said motor and to the other terminal of said source, a third serial circuit extending from said one terminal of said source, said controlling switch, said electromagnetic means, to the other terminal of said source, said first and second control switches being connected in parallel through said controlling switch.

References Cited in the file of this patent
UNITED STATES PATENTS

| | | |
|---|---|---|
| 2,211,769 | Drake | Aug. 20, 1940 |
| 2,333,848 | Di Vette | Nov. 9, 1943 |